US011295285B1

(12) United States Patent
Desai (10) Patent No.: US 11,295,285 B1
(45) Date of Patent: Apr. 5, 2022

(54) SYSTEM AND METHOD FOR FINANCIAL SERVICES KIOSK FEATURES

(71) Applicant: JPMorgan Chase Bank, N.A., New York, NY (US)

(72) Inventor: Prashant Desai, Land O Lakes, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 684 days.

(21) Appl. No.: 15/478,825

(22) Filed: Apr. 4, 2017

Related U.S. Application Data

(60) Provisional application No. 62/319,492, filed on Apr. 7, 2016.

(51) Int. Cl.
*H04L 29/06* (2006.01)
*H04N 7/14* (2006.01)
(Continued)

(52) U.S. Cl.
CPC ......... *G06Q 20/18* (2013.01); *G06Q 20/1085* (2013.01); *G06Q 20/405* (2013.01);
(Continued)

(58) Field of Classification Search
CPC ........ G06Q 20/18; G06Q 20/10; G06Q 40/02; G06Q 20/1085; G06Q 20/042; G06Q 20/065; G06Q 20/108; G06Q 20/20; G06Q 10/1057; G06Q 20/04; G06Q 20/08; G06Q 20/105; G06Q 20/206; G06Q 20/3223;
(Continued)

(56) References Cited

U.S. PATENT DOCUMENTS 6,996,603 B1 * 2/2006 Srinivasan ............. H04L 67/36
370/352
7,822,684 B2 * 10/2010 Rielly ................ G06Q 20/1085
235/379
(Continued)

FOREIGN PATENT DOCUMENTS

FR 2919142 A1 * 1/2009 ......... H04L 65/1036
WO WO-2006108168 A2 * 10/2006 ....... H04L 29/06027

OTHER PUBLICATIONS

Ten Things CIOs Should Know about WebRTC, Anticipating and Preparing for Massive Disruption to Your Communications Environment and Engagement Strategies, E Brent Kellie, KelCor, 29 pages, Apr. 2013 (Year: 2013).*

(Continued)

*Primary Examiner* — Virpi H Kanervo
(74) *Attorney, Agent, or Firm* — Hunton Andrews Kurth LLP (57) ABSTRACT

A system including voice, video, and chat capability at financial services kiosks (e.g., ATMs) is disclosed. The voice, video, and chat and capabilities may be implemented using Web Real-Time Communication (WebRTC). A customer can complete all transactions and interactions with a live person in real time at the financial services kiosk. The financial services kiosk can be located anywhere in the world and only requires an Internet connection to support the system. The live person is remotely located from the financial services kiosk and can be available 24/7. The live person may be a teller or specialist located in a contact center.

20 Claims, 3 Drawing Sheets

(51) Int. Cl.
*G06Q 20/40* (2012.01)
*G06Q 20/10* (2012.01)
*H04N 7/18* (2006.01)
*G06Q 20/18* (2012.01)
*H04L 65/65* (2022.01)
*H04L 65/1069* (2022.01)
*G06Q 20/00* (2012.01)

(52) U.S. Cl.
CPC ..... *G06Q 20/4014* (2013.01); *H04L 65/1069* (2013.01); *H04L 65/608* (2013.01); *H04N 7/147* (2013.01); *H04N 7/185* (2013.01)

(58) Field of Classification Search
CPC .. G06Q 20/4016; G06Q 30/016; G06Q 30/06; G06Q 30/0601; G06Q 40/125; G06Q 10/10; G06Q 10/105; G06Q 20/209; G06Q 20/354; G06Q 20/3674; G06Q 20/401; G06Q 20/40145; G06Q 30/02; G06Q 40/00; G06Q 40/025; G06Q 20/12; G06Q 20/202; G06Q 20/28; G06Q 20/322; G06Q 20/327; G06Q 20/34; G06Q 20/342; G06Q 20/4014; G06Q 30/0237; G06Q 30/0269; G06Q 30/0631; G06Q 40/08; G06Q 50/22; G06Q 10/00; G06Q 10/0631; G06Q 10/06313; G06Q 10/0635; G06Q 10/08; G06Q 10/087; G06Q 20/102; G06Q 20/14; G06Q 20/145; G06Q 20/204; G06Q 20/207; G06Q 20/227; G06Q 20/26; G06Q 20/29; G06Q 20/3221; G06Q 20/3224; G06Q 20/3276; G06Q 20/3278; G06Q 20/348; G06Q 20/352; G06Q 20/367; G06Q 20/382; G06Q 20/3821; G06Q 20/3829; G06Q 20/387; G06Q 20/40; G06Q 20/403; G06Q 2240/00; G06Q 30/0201; G06Q 30/0203; G06Q 30/0204; G06Q 30/0205; G06Q 30/0206; G06Q 30/0207; G06Q 30/0215; G06Q 30/0222; G06Q 30/0225; G06Q 30/0239; G06Q 30/0241; G06Q 30/0251; G06Q 30/0253; G06Q 30/0256; G06Q 30/0268; G06Q 30/0271; G06Q 30/0281; G06Q 30/0283; G06Q 30/0607; G06Q 30/0613; G06Q 30/0617; G06Q 30/0635; G06Q 30/0641; G06Q 40/04; G06Q 40/12; G06Q 50/10; G06Q 50/12; G06Q 20/405; G07F 17/3206; G07F 9/023; G07F 19/20; G07F 19/2055; G07F 11/002; G07F 17/42; G07F 19/205; G07F 17/3209; G07F 17/3225; G07F 17/3227; G07F 17/3237; G07F 17/3241; G07F 17/3246; G07F 17/3251; G07F 19/201; G07F 9/10; G07F 11/00; G07F 11/62; G07F 13/06; G07F 17/3218; G07F 17/3223; G07F 17/323; G07F 17/3262; G07F 17/3267; G07F 17/3276; G07F 17/3279; G07F 17/329; G07F 17/3293; G07F 17/3295; G07F 19/202; G07F 19/206; G07F 19/209; G07F 19/211; G07F 5/24; G07F 7/00; G07F 7/005; G07F 7/0813; G07F 7/0826; G07F 7/086; G07F 7/0873; G07F 7/0893; G07F 7/1033; H04M 3/5238; G07C 11/00; H04N 7/185; H04N 7/147; H04L 65/1069; H04L 65/608
See application file for complete search history.

(56) References Cited

U.S. PATENT DOCUMENTS

| | | | | |
|---|---|---|---|---|
| 8,281,010 | B2* | 10/2012 | Ansari | H04L 41/22 709/225 |
| 9,514,333 | B1* | 12/2016 | Patel | H04L 63/0428 |
| 9,667,790 | B1* | 5/2017 | Desai | H04M 3/42068 |
| 2007/0058639 | A1* | 3/2007 | Khan | H04L 12/4633 370/395.52 |
| 2007/0189220 | A1* | 8/2007 | Oberle | H04L 65/1083 370/331 |
| 2011/0249081 | A1* | 10/2011 | Kay | H04M 3/5183 348/14.03 |
| 2012/0233334 | A1* | 9/2012 | Braudes | H04L 67/141 709/227 |
| 2014/0314226 | A1* | 10/2014 | Ordille | H04M 3/523 379/266.01 |
| 2015/0350439 | A1* | 12/2015 | Holden | H04M 3/5166 379/265.09 |
| 2016/0225071 | A1* | 8/2016 | Breen | G06Q 40/02 |
| 2016/0285891 | A1* | 9/2016 | Byers | H04L 63/0884 |
| 2017/0141934 | A1* | 5/2017 | Ding | H04L 12/66 |

OTHER PUBLICATIONS

Web RTC: The Web Way to Communicate, Alan Johnston, Dan Burnet, presentation given at WebRTC IEEE St. Lousis & COMSOC, Apr. 2013. (Year: 2013).*

WebRTC for Dummies, 2nd Sonus Special Edition, Justin Hart, copyright 2016 John Wiley & Sons, Inc. (Year: 2015).*

Baugh, C. R et al. "Personal Access Communications System: Fixed Wireless Local Loop and Mobile Configurations and Services : The Mobile Radio Centennial." Proceedings of the IEEE 86.7 (1998): 1498-1506. (Year: 1998).*

Batteram, Harold et al. "Delivering Quality of Experience in Multimedia Networks." Bell Labs technical journal 15.1 (2010): 175-193. (Year: 2010).*

* cited by examiner

SYSTEM AND METHOD FOR FINANCIAL SERVICES KIOSK FEATURES

CROSS-REFERENCE TO RELATED APPLICATIONS

The present invention claims priority to U.S. Provisional Application No. 62/319,492, filed Apr. 7, 2016, the contents of which are incorporated herein by reference in its entirety. The disclosures of the following documents are hereby incorporated, by reference, in their entireties: U.S. Pat. No. 7,822,684; U.S. patent application Ser. Nos. 13/027,624; 14/681,372, and 14/681,421.

FIELD OF THE VARIOUS EMBODIMENTS

Various embodiments relate generally to providing financial services, such as through devices including financial services kiosks that provide voice, video, and chat communications capabilities.

BACKGROUND

Financial institution customers use Automated Teller Machines ("ATMs") to perform certain financial institution transactions. At traditional ATMs, customers cannot typically contact a teller or bank employee for assistance.

U.S. Pat. No. 7,814,016, entitled "Personal Teller System and Method of Remote Interactive and Personalized Banking," describes providing personalized services through a teller machine, including using only audio and/or video communications between a customer and a teller at the teller machine over a network, but fails to describe the protocol used for the communications. However, in these older types of system, customers interact with tellers using multiple channels. These interactions are contained in each of the channels where data is stored and then delivered separately to the contact centers solution and then eventually to the appropriate agent. Accordingly, each channel operates as a stand-alone silo. Implementations with Voice over Internet Protocol (VoIP) and Time Division Multiplexing (TDM) in contact centers require third party call control and/or applications to deliver data to the contact center desktop.

Furthermore, traditional or legacy contact centers typically use telephony devices, such as a phone on the desk VoIP or TDM or a thick client (soft phone) with H.323 or SIP on the desktop. As a result, additional external applications in the contact centers are needed to provide data from a voice portal or other channels the customer interacted with before reaching the contact center agent Importantly, improving this remote communications capability may be cost prohibitive to enable in "legacy" type Automated Teller Machines given the network infrastructure required as well as the equipment and programming needed, which may not integrate with these older machines which may not have a dedicated network (Internet) connection and which may have a fixed form factor that prohibits integration of new equipment; further the processing power of the ATM may not be sufficient On the customer side, many customers only have only one transaction to accomplish but need to confer with a teller or bank employee regarding the transaction. The customer has to go into the branch office since an ATM is unable to perform the desired service and does not provide options for interfacing with a teller or bank employee. Furthermore, the hours for the branch office are typically limited. Also, at traditional financial institution branches, a customer is required to wait in a line for the next available teller or customer service representative in order to complete their desired transaction. Such waiting consumes time and may deter the customer from attempting the transaction.

These and other deficiencies exist.

SUMMARY OF THE VARIOUS EMBODIMENTS

Various embodiments include a system including voice, video, and chat capability at financial services kiosks (e.g., ATMs). The capabilities may be implemented using Web Real-Time Communication (WebRTC). A customer can complete all transactions and interactions with a live person in real time at the financial services kiosk. The financial services kiosk can be located anywhere in the world and only requires an Internet connection to support the system. The live person is remotely located from the financial services kiosk and can be available 24/7. The live person may be a teller or specialist located in a contact center. Additionally, the enablement of video streaming from the financial services kiosk may include security monitoring.

An exemplary embodiment include a system having a network connection such that the financial services kiosk communicates over the network using WebRTC; a microphone and a speaker configured for voice communications using WebRTC; a video camera configured for transmitting video communications using WebRTC; a display configured for receiving and displaying video communications using WebRTC and the display further configured to support a chat capability using WebRTC; and an input device configured for inputting in conjunction at least the chat capability.

Another exemplary embodiment includes a method having the following steps: logging into the financial services kiosk that is communicatively coupled to a network using WebRTC; presenting, at the financial services kiosk, one or more available communication options to communicate with a third party; selecting, at the financial services kiosk, an option from the one or more available communications options; placing one or more calls in response to selection of the option; negotiating one or more communication paths based on placing of the one or more calls; establishing one or more secured communication paths; and communicating with the third party based on the one or more secured established communication paths to conduct the one or more transactions.

Advantages of the various embodiments including those described above are apparent from the following detailed description of the various embodiments.

DETAILED DESCRIPTION OF THE VARIOUS EMBODIMENTS

It will be readily understood by those persons skilled in the art that the various embodiments described herein are capable of broad utility and application.

Accordingly, while the various embodiments are described herein in detail in relation to the various embodiments, it is to be understood that this disclosure is illustrative and exemplary of the various embodiments and is made to provide an enabling disclosure. Accordingly, the disclosure is not intended to be construed to limit the various embodiments or otherwise to exclude any other such embodiments, adaptations, variations, modifications and equivalent arrangements. While the various embodiments are described in the context of financial services devices and financial institution customer service, the methods and systems described herein may be applied to other related items, such as other types of financial transactions or accounts.

The following descriptions are provided of different configurations and features according to various embodiments. These configurations and features may relate to providing financial services through financial services kiosks and branch offices. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details regarding the various embodiments. It should also be appreciated that these various embodiments are provided as non-limiting examples only.

Financial services kiosks, as used herein, may include devices and stations for performing financial services transactions. These devices may include, but are not limited to, ATMs, personal teller machines ("PTMs"), financial self-service devices, money machines, cash machines, bank machines, and bancomats.

Figure 1:
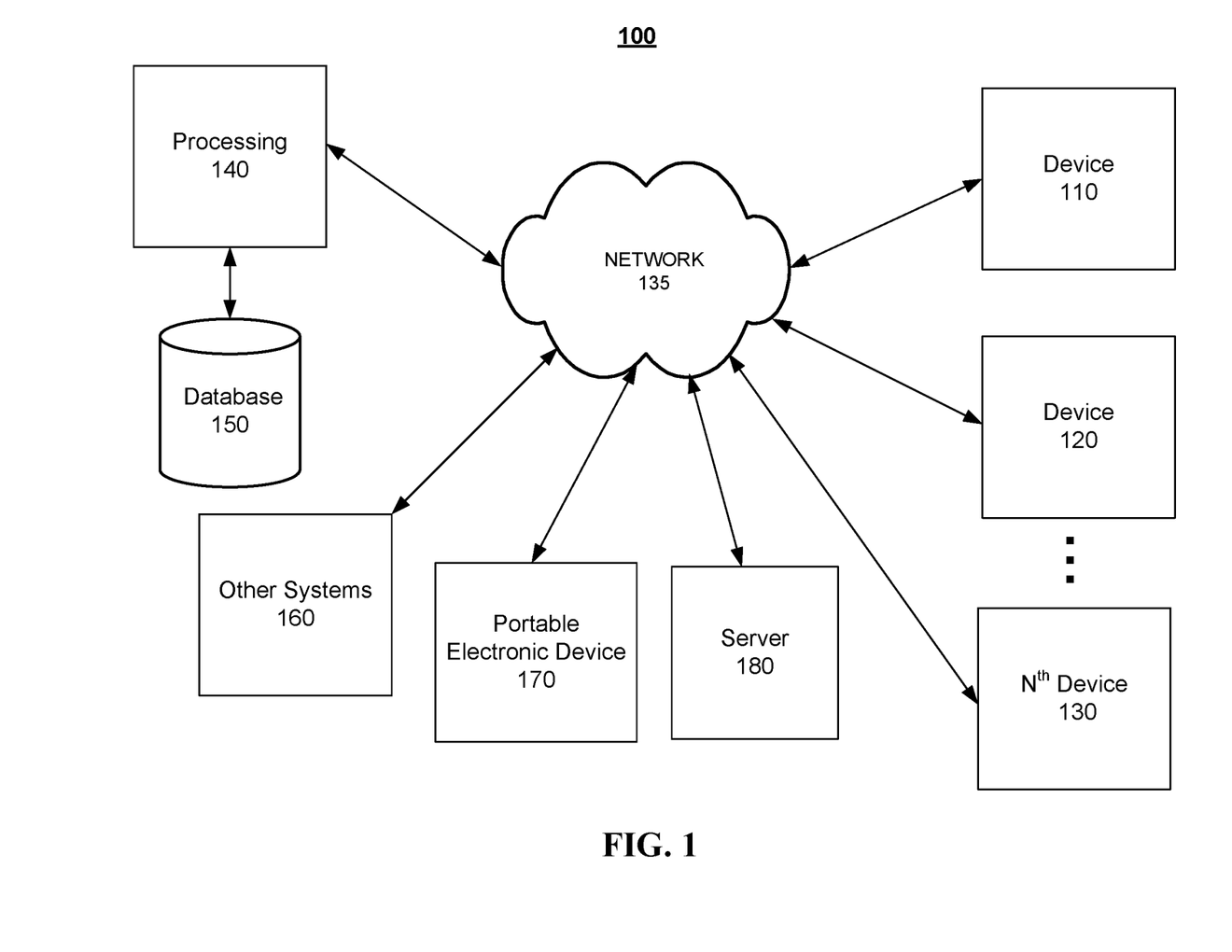
FIG. 1 is a diagram of a system in accordance with various embodiments.

FIG. 1 is a system according to various embodiments. System 100 may provide various functionality and features. More specifically, system 100 may include a device 110, a second device 120, and an Nth device 130, a network 135, a processing module 140, a database 150, other systems 160, portable electronic device 170, and server 180.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 100 may be integrated into and run on a computer, which may include a programmed processing machine which has one or more processors. Such a processing machine may execute instructions stored in a memory to process the data. System 100 may be integrated into and run on one or more computer networks which may each have one of more computers associated therewith. The computers and devices of the system 100 may be specialized computing devices as described herein.

As noted above, the processing machine executes the instructions that are stored in the memory or memories or persistent data storage devices to process data. This processing of data may be in response to commands by a user or users of the processing machine, in response to previous processing, in response to a request by another processing machine and/or any other input, for example. As described herein, a module performing functionality may have a processor.

According to various embodiments, the system 100 may be configured to carry out the methods as described herein. The system 100 may have device 110 associated therewith. A second device 120 and an Nth device 130 may be further associated with the system 100. The devices 110, 120, and 130 may each be a processing machine. Each device 110, 120, and 130 may include software and/or modules to implement the methods described herein according to various embodiments. Each device 110, 120, and 130 may provide processing, display, storage, communications, and execution of commands in response to inputs from a user thereof and respond to requests from the software and/or modules.

The devices 110, 120, and 130 may each serve as a client side. Each device 110, 120, and 130 may be a "fat" client, such that the majority of the processing may be performed on the client. Alternatively, the device 110, 120, and 130 may each be a "thin" client, such that the majority of the processing may be performed in the other components of the system 100 as best shown in FIG. 1. The devices 110, 120, and 130 may be configured to perform other functions and processing beyond the methods described herein. The devices 110, 120, and 130 may each be a part of a larger system associated with the financial institution. The devices 110, 120, and 130 may be multi-functional in operation. The devices 110, 120, and 130 may be financial service kiosks.

Each device 110, 120, and 130 may have a display and an input device associated therewith. The display may be monochrome or color. For example, the display may be a plasma, liquid crystal, or cathode ray tube type display. In various embodiments, the device 110, 120, and 130 may have multiple displays. For example, there may be two displays. The input device may be a single device or a combination of devices. In various embodiments, the display may be an input device. For example, the input devices may include a keyboard, both full-sized QWERTY and condensed, a numeric pad, an alpha-numeric pad, a track ball, a touch pad, a mouse, selection buttons, and/or a touch screen. The devices 110, 120, and 130 may include other devices such as a printer and a device for accepting deposits and/or dispensing currency and coins.

According to various embodiments, the devices 110, 120, and 130 may be financial services kiosks. The financial services kiosk may be a transaction device for conducting transactions with the financial institution and as such, the financial services kiosk may be a specialized computing device. For example, the devices 110, 120, and 130 may be a traditional or typical ATM. The ATM may be programmed to perform a variety of specific tasks, including financial transactions.

The devices 110, 120, and 130 may have a log-in device associated therewith. The log-in device may be used to allow access to the device. The log-in device may require a particular input or it may accept a combination of inputs. The input may serve as an authentication of the user to the device 110, 120, or 130 and the system 100 in general. Various authentication or log-on systems and methods may be used. For example, these methods and systems may include entering a password or PIN (Personal Identification Number) or using a card to log-on, either via swiping the card through a reader, such as a magnetic stripe reader or a smart chip reader, or through a radio frequency system (which may require that the card be placed in proximity to an appropriate reader (i.e., a contactless system), such as RFID (Radio Frequency Identification) or NFC (Near Field Communications). For example, the Blink® system may be used. It should be appreciated that the card may include a combination of a magnetic stripe, a smart chip, and radio frequency. Further, the use of the card is exemplary only and the card may include fobs, stickers, and other devices. Biometrics may be used, such as fingerprints, facial recognition, speech recognition, or retinal scan. A combination of these systems may be used. Biometrics may be used in addition to other log-in methods and systems.

The devices 110, 120, and 130 may provide various functionality and features for conducting transactions with the financial institution. For example, the devices 110, 120, and 130 may be capable of accepting deposits and mixed deposits, withdrawals and multi-denomination withdrawals, coin deposits/withdrawal, check cashing, cash recycling, statement printing, wires, bill pay and check printing. It should be appreciated that the devices 110, 120, and 130 may be capable of other functions and features. Transactions may be supported relating to other financial institutions. For example, the device may be part of a network associated with more than one financial institution. The network may be managed by a third party.

The devices 110, 120, and 130 may have interfaces and equipment allowing for the use of voice communications, video communications, and chat communications. The communications may be uni- or bi-directional and may be simplex or full duplex in nature. The financial services kiosk may have a digital imaging device, such as a camera. This capability may be used to allow the customer to get assistance from a remote customer service agent using video, audio (voice communications), and/or text communications. The digital imaging device may enable the customer to interact on a real-time basis with the customer service agent through the financial services kiosk. An electronic video image of the customer service agent may be provided on the financial services kiosk's display. The financial services kiosk may have access to various programs or applications for conducting conversations. For example, the financial services kiosk may have access to Skype or other video messaging services. The financial services kiosk may have a microphone and a speaker to provide for voice communications capability. There may be multiple microphones and speakers. In various embodiments, a headphone jack may be provided to allow for the use of an external headset for voice communications. In certain embodiments, a wireless connection, such as Bluetooth, may be used to support external microphones and/or speakers.

The customer service agent may be available 24 hours a day, 7 days a week, according to some embodiments. In other embodiments, the customer service agent may have a predetermined availability. The financial services kiosk may have chat capability in addition to the video and audio capability. The chat capability may be through the interface of the financial services kiosk, such as through the display and input devices.

According to various embodiments, once the communication path is established between the customer and the customer service agent, the customer may interact and receive assistance from the customer service agent by voice, video, and/or chat (i.e., text) communications. For example, information (e.g., the identity of the customer as well as their associated account information) may be made available to the customer service agent with which the customer is communicating. The assistance provided by the customer service agent to the customer may include, in real time by voice, video, and/or chat, responding to one or more inquiries or requests posed by the customer in order to assist the customer to conduct a transaction, which may or may not include the information made available to the customer service agent.

When the customer requests an initial or desired communication type with the customer service agent, one or more other communication types may be enabled during the initial or desired communication type, without terminating and re-establishing the initial or desired communication type, to complement the initial or desired communication type so that the customer service agent may provide further instructions that the user may receive to improve the efficiency of conducting the desired transaction at the financial services kiosk. For example, the customer may request a desired available communication type such as a chat conversation with the customer service agent to receive assistance. Another communication, such as a video communication, may be enabled during the desired communication with the customer service agent, without terminating and re-establishing the chat conversation, to complement the chat conversation because the chat conversation is displayed as text. As a consequence of enabling video communication, the customer service agent may provide specific instructions via the chat session (for example) that the customer may see, reference or otherwise use (i.e., to complete a desired transaction at the financial services kiosk) as well as visually communicating with the customer.

The customer may request one or more initial or desired communication types (e.g. voice, video, and/or chat), which may or may not be available depending on the availability of the customer service agent, and the remaining one or more communication types (e.g., the voice, video, and/or chat that was not initially available or otherwise enabled) may be enabled, without dropping and re-establishing the one or more initial or desired communication types, to complement the one or more initial or desired communication types. According to other embodiments, the one or more initial or desired communication types between the customer and the customer service agent may be terminated and/or substituted by the remaining one or more communication types, depending on the customer's request and the customer service agent's availability. As further explained below, this allows for a seamless interaction between the customer and the customer service agent, provides for one or more types of communications and interactions between the customer and the customer service agent, and provides for increased efficiency.

The devices 110, 120, and 130 may be communicatively coupled to a network 135. The devices 110, 120, and 130 may be communicatively coupled to the network 135 using, at least in part, Web Real-Time Communication (WebRTC). Accordingly, the devices 110, 120, and 130 may be geographically dispersed. Conversely, two or more of devices 110, 120, and 130 may be located in close proximity to provide a cluster of devices for customer use. For example, the devices may be located within or near a branch office of the financial institution. The devices may be located in other locations such as retailers or merchants.

According to various embodiments, the devices 110, 120, and 130 which employ WebRTC according to various embodiments may have certain other features to ensure the privacy of the customer's communications during a voice, video, and/or chat session with the customer service agent. For example, the device 110, 120, and 130 may be located in an enclosure to give the customer privacy and prevent others from eavesdropping. In other embodiments, the device 110, 120, and 130 may have a privacy screen or other structure to shield the display from viewing by others not directly in front of the display. Further, the device 110, 120, and 130 may have a headphone jack to allow for the customer to plug in headphones to keep the a portion of the session with the customer service agent, such as the voice portion, private. In other embodiments, the device 110, 120, and 130 may have Bluetooth capability to allow for wireless linking with a customer's portable electronic device 170 or headset. The Bluetooth capability may be enabled on the financial services kiosk for the duration of the communications session with the customer service agent for security purposes. The enablement of a communication type, such as video streaming, from the financial services kiosk during the communications session with the customer service agent may be used for security monitoring of the area during the communication session.

Network 135 may be a computer based network, with one or more servers and/or computer processors. For example, network 135 may be the Internet or a network connected to the Internet. The network 135 may be a satellite or cellular based network. Information and data may be exchanged through the network 135 between the various components of the system 100. In alternative embodiments, the network 135 may be a local area network within the financial institution that may be connected to or interface with the Internet. It should be appreciated that the network 135 may be a combination of local area networks, wide area networks, and external networks, which may be connected to the Internet.

The processing module 140 may be communicatively coupled to the network 135. The processing module 140 may perform operations associated with the establishment, configuration, and application of the programs accordingly to various embodiments. The processing module 140 may consist of one or more servers and/or general purpose computers, each having one or more computer processors associated therewith. The server 140 may be a specialized computing device.

The processing module 140 may have a database 150 communicatively coupled thereto. The database 150 may contain data and information used by the system 100. For example, the database 150 may store account data for financial institution account holders. Additional information may be contained therein related to the operation and administration of the system 100. The database 150 may include any suitable data structure to maintain the information and allow access and retrieval of the information. For example, the database may keep the data in an organized fashion. The database 150 may be a database, such as an Oracle database, a Microsoft SQL Server database, a DB2 database, a My SQL database, a Sybase database, an object oriented database, a hierarchical database, a flat database, and/or another type of database as may be known in the art that may be used to store and organize rule data as described herein.

The database 150 may be stored in any suitable storage device. The storage device may include multiple data storage devices. The multiple data storage devices may be operatively associated with the database 150. The storage may be local, remote, or a combination thereof with respect to the database. The database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database may have back-up capability built-in. Communications with the database 150 may be over a network, such as the network 135, or communications may be over a direct connection between the database 150 and the processing module 140, as depicted in FIG. 1. Data may be transmitted and/or received from the database 150. Data transmission and receipt may utilize cabled network or telecom connections such as an Ethernet RJ15/Category 5 Ethernet connection, a fiber connection, a traditional phone wireline connection, a cable connection or other wired network connection. A wireless network may be used for the transmission and receipt of data.

The system 100 may have other systems 160 associated therewith. These other systems 160 may include various data collection and support systems used by the financial institution to carry out its functions.

The system 100 may include one or more portable electronic devices 170 (only a single device is depicted in FIG. 1, but additional devices may be part of the system 100). The portable electronic device 170 may be more than one portable electronic device. The portable electronic device 170 may be associated with a customer. The customer may interact with the portable electronic device 170 through various input means (not shown). For example, the portable electronic device 170 may have a display screen to convey information to the customer. The display may be a color display. For example, the display may be a Liquid Crystal Display ("LCD"). The portable electronic device 170 may have one or more input devices associated with it. For example, the portable electronic device 170 may have an alpha-numeric keyboard, either physical or virtual, for receiving input. The portable electronic device 170 may have a QWERTY style keyboard, either physical or virtual. The portable electronic device 170 may have a pointing device associated therewith, such as, for example, a trackball or track wheel. As described above, the portable electronic device 170 may have communication capabilities over both cellular and wireless type networks to transmit/receive data and/or voice communications.

The portable electronic device 170, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device 170. The portable electronic device 170 may use standard wireless protocols which may include IEEE 802.11a, 802.11b, 802.11g, and 802.11n. Such portable electronic devices may be Global Positioning System (GPS) capable. GPS is a satellite based system which sends a signal allowing a device to define its approximate position in a coordinate system on the earth. That is, the portable electronic device 170 may receive satellite positioning data and display the location on the earth of the portable electronic device using GPS. Other location systems may be used. The portable electronic device 170 may include one or more computer processors and be capable of being programmed to execute certain tasks.

The portable electronic device 170 may establish communications with a server 180. Communications may be established over the network 135. Upon successful initiation of communications between the portable electronic device 170 and the server 180, data may be exchanged between the device 170 and the server 180. Data may be transmitted from the portable electronic device 170 to the server 180. Data may be transmitted from the server 180 to the portable electronic device 170.

According to some embodiments, the portable electronic device 170 may interact with the device 110, 120, or 130. Through the device 110, 120, or 130, the portable electronic device 170 may interact with the server 180 or other parts of the system 100. That is, the device 110, 120, or 130 may serve as an access point to the system 100 for the portable electronic device 170. In some embodiments, the portable electronic device 170 may contain an application or other programming enabling the performance of financial transactions, separate from, or in conjunction with, a financial services kiosk, such as devices 110, 120, and 130. For example, the portable electronic device 170 may interface with the device 110, 120, and 130 either directly or through the network 135 as described above. In certain embodiments, additional devices may be coupled to the portable electronic device 170 to perform various functions such as accepting deposits or dispensing currency.

It should be appreciated that the server may interact with other parts of the system 100, such as the devices 110, 120, and 130, as well as the processing module 140 and the other systems 160. The server 180 may be a single server or it may be multiple servers. The server 180 may server a variety of roles in the system 100.

The server 180 may have one or more storage devices associated therewith. The storage may be local, remote, or a combination thereof with respect to the server 180. The storage may utilize a redundant array of disks (RAID), striped disks, hot spare disks, tape, disk, or other computer accessible storage. In one or more embodiments, the storage may be a storage area network (SAN), an Internet small computer systems interface (iSCSI) SAN, a Fiber Channel SAN, a common Internet File System (CIFS), network attached storage (NAS), or a network file system (NFS). The storage may have back-up capability built-in. The back-up capability of the storage may be used to archive image data for later use. The back-up capability may be used for recovery of data in the event of a failure of the storage.

Figure 2:
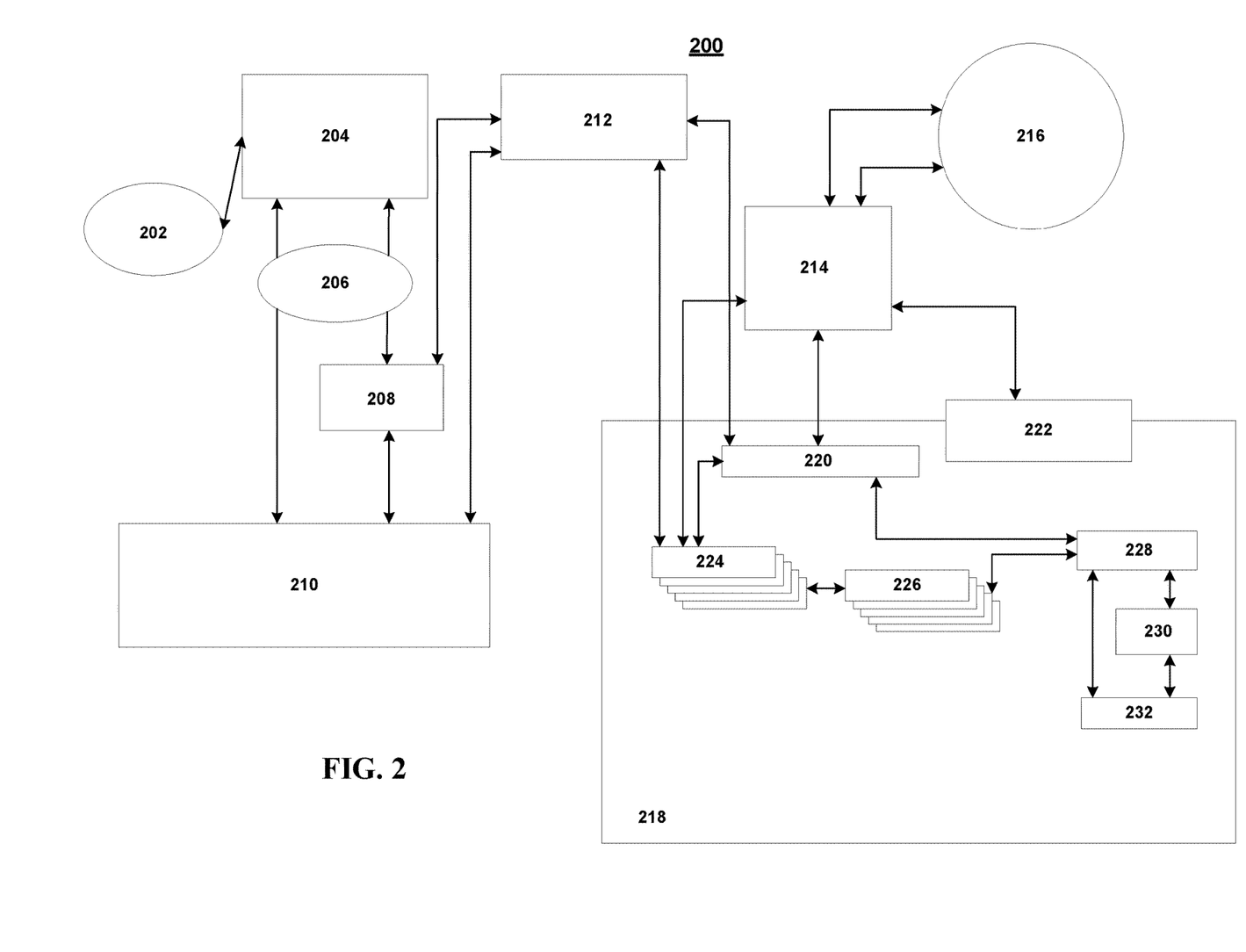
FIG. 2 is system diagram of a WebRTC implementation in accordance with various embodiments.

FIG. 2 depicts a flow chart of Web Real-Time Communication (WebRTC), which may be used in the various embodiments to enable the use of the voice, video, and chat capability at the financial services kiosk. WebRTC is an application programming interface (API) definition that supports browser-to-browser applications for voice calling, video chat, and peer to peer (P2P) file sharing without the need of either internal or external plugins. WebRTC provides browsers and mobile applications with Real-Time Communications (RTC) capabilities via simple APIs. WebRTC allows for multi-channel interaction, e.g., voice, chat, and video, etc. WebRTC can be used with an bandwidth and scales appropriately based on available network bandwidth.

According to various embodiments, voice may be carried over a data channel and may also include computer telephony integration (CTI) data as part of the same data channel. WebRTC, from the client interaction perspective, allows the user to start a chat conversation and then change seamlessly to voice and/or video conversation without dropping the session and re-establishing the session when the channel is changed. This will allow the user to have a seamless interaction with the contact center to resolve the reason for the contact. Combining voice, video and chat into a single protocol and adding customer specific data, various embodiments realize improved efficiencies and improved technology in customer servicing centers.

The Session Initiation Protocol (SIP) is a telecommunications protocol for signaling and controlling multimedia communication sessions. Common applications of SIP are in Internet telephony for voice and video calls, as well as instant messaging over Internet Protocol (IP) networks. The SIP protocol defines the messages that are sent between endpoints, which govern establishment, termination and other essential elements of a call. SIP can be used for creating, modifying and terminating sessions including one or several media streams.

SIP is independent from the underlying transport protocol. In other words, it runs on the Transmission Control Protocol (TCP), the User Datagram Protocol (UDP) or the Stream Control Transmission Protocol (SCTP). SIP can be used for two-party (unicast) or multiparty (multicast) sessions. SIP employs design elements similar to the HTTP request/response transaction model. For example, each transaction includes a client request that invokes a particular method or function on the server and at least one response. SIP reuses most of the header fields, encoding rules and status codes of HTTP, providing a readable text-based format. Various embodiments may use SIP as part of the communications link over WebRTC.

FIG. 2 depicts a system diagram of a WebRTC implementation according to various embodiments. The system 200 may include a plurality of components. A user or customer 202 may be required to log into a financial services kiosk 204, such as an ATM. By logging in, the customer's 202 identity can be verified and that information (e.g., the identity of the customer 202, as well as their associated account information) can be available to a teller or specialist with which the customer 202 is communicating. For example, the customer 202 may be required to present a debit or ATM card along with a PIN to authenticate at the ATM 204. In various embodiments, other forms of authentication may be used. For example, a cardless login may be used. In other embodiments, biometric authentication may be used. In other embodiments, multi-factor authentication may be used.

The financial services kiosk 204 may communicate a request, as selected by the customer 202, for a desired communication type(s), such as a voice, video, and/or chat request to a WebRTC gateway 208 through a network 206, such as the Internet. The WebRTC gateway 208 may convert HTTPS to SIP/S for performing signaling conversion of the request, and may communicate with a WebRTC media broker 210. The financial services kiosk 204 also may communicate to the WebRTC media broker 210 by a secure communication, such as SRTP, for encrypting the content for voice and/or video and HTTPS for chat.

The WebRTC gateway 208 and WebRTC media broker 210 may communicate with a session border controller (SBC) dedicated web network 212 by SIP/S and SRTP, respectively, and is dedicated for WebRTC calls made thereto. The SBC dedicated web network 212 may communicate with a contact center suite 218. Specifically, the SBC dedicated web network 212 may communicate with one or more media servers 224 and SIP session manager or Stateful/Stateless SIP Server 220 of the contact center suite 218. The one or more media servers 224 may be one or more media queue servers for hosting call control XML, voice XML, state chart XML, (CCXML, VXML, SCXML), and include network call queuing, music-on-hold (MOH)/wait treatment, and time in-queue. The SIP session manager or Stateful/Stateless SIP Server 220 may manage the inbound/outbound SIP messages, and include phone registration, dynamic load balancing, proxy/resiliency, and state of the device. The one or more media servers 224 and SIP session manager or Stateful/Stateless SIP Server 220 may communicate with an SBC carrier 214, which may communicate the request to a Carrier SIP server 216 by RTP for a return delivery to the SBC carrier 214.

The SBC carrier 214 may include a firewall, network address translation, is SIP RFC and REC compliant, including support of call transfers initiated by SIP REFER messages, RE-INVITE, REFER with REPLACES, dual SBC with shared session, transcoding for G.711/G.729 media, performance of call admission control (CAC) operations, protection against denial-of-service (DoS) and distributed denial-of-service attacks (DDoS), quality of service, and media forking with call recording 222, all of which may be also performed by SBC dedicated web network 212.

The contact center suite 218 also may include one or more application servers 226, which communicate with the one or more media servers 224. The one or more application servers 226 may include network call queuing, music-on-hold (MOH)/wait treatment, progress of outbound calls, time in-queue, and callback.

The contact center suite 218 also may include an orchestration engine 228 which communicates with the SIP session manager or Stateful/Stateless SIP Server 220, a routing/queuing layer 230 which communicates with the orchestration engine 228, and an agent and channel state machine 232 which communicates with the orchestration engine 228 and the routing/queuing layer 230. The orchestration layer 228 provides for workflow and segmentation of data. The routing/queuing layer 230 also may include rules for business, rules for routing one or more requests, and queue characteristics.

The SIP session manager or Stateful/Stateless SIP Server 220 requests the orchestration engine 228 provide an end point for queuing or an agent to send call/interaction to. Based on the customer/call/interaction profile, the orchestration engine 228 applies a set of one or more business rules to determine the next steps for answering the call/interaction. By way of non-limiting examples, the one or more business rules may include: business hours; time zone; location, such as geographic location; premier and/or premium status of customer; or any combination thereof. For example, the orchestration engine 228 may apply a rule pertaining to whether the teller or contact center is operating and within its business hours. In the event that the teller contact center is unavailable, such as, for example, being closed due because it is outside of its business hours, the call/interaction may be transferred to an alternative teller or contact center that is available, for example, because it is within the business hours for that alternative teller or contact center because the alternative teller or contact center may be located in a different location or different time zone, and/or may operate under different business hours. In other embodiments, the location to answer the call/interaction may be within the same or different city, town, region, county, state, or country. The request for the call/interaction may be routed based on its origin and/or the time of the request.

Additionally, or alternatively, the orchestration engine 228 may apply a rule pertaining to whether the customer is a premier or premium customer. For example, such a designation of the customer may include factors such as, but not limited to, a holder or owner of a premium card such as a premium bank card (e.g., a particular credit or debit card); a holder or owner of a premium points/rewards-based account; a holder or owner of a premier checking or savings account; or is otherwise a preferred or VIP customer, such as determined by a financial institution. By determining whether the customer is classified as a premier or a premium customer, the customer may be provided preferential treatment when requesting the call/interaction, such as being given a higher, enhanced or otherwise advantageous priority in the queue for the request of the call/interaction. Based on the results of the one or more business rules, the orchestration engine 228 calls the routing/queuing layer 230 to determine which location/site/agent may best answer the call/interaction. This determination is based on one or more routing rules, which may include matching agents skills to customer request for the best customer experience. By way of non-limiting examples, the skills of the agent may include one or more skills, including: language (e.g. English, Spanish, etc.); technical competency (e.g. support for PC or Macintosh, etc.); specialty, such as transaction specialty (e.g. card, mortgage, finance, collections, etc.); or specialty, such as product specialty (e.g. TV, microwave, etc.); or any combination thereof. The agent and channel state machine 232 maintains the current state of every interaction/call in progress and the state of every agent currently logged in the system. The routing/queuing layer 230 depends on this component to identify the best agent. If the call/interaction is queued, then the queue characteristic(s), such as service level, average speed of answer, are applied.

Figure 3:
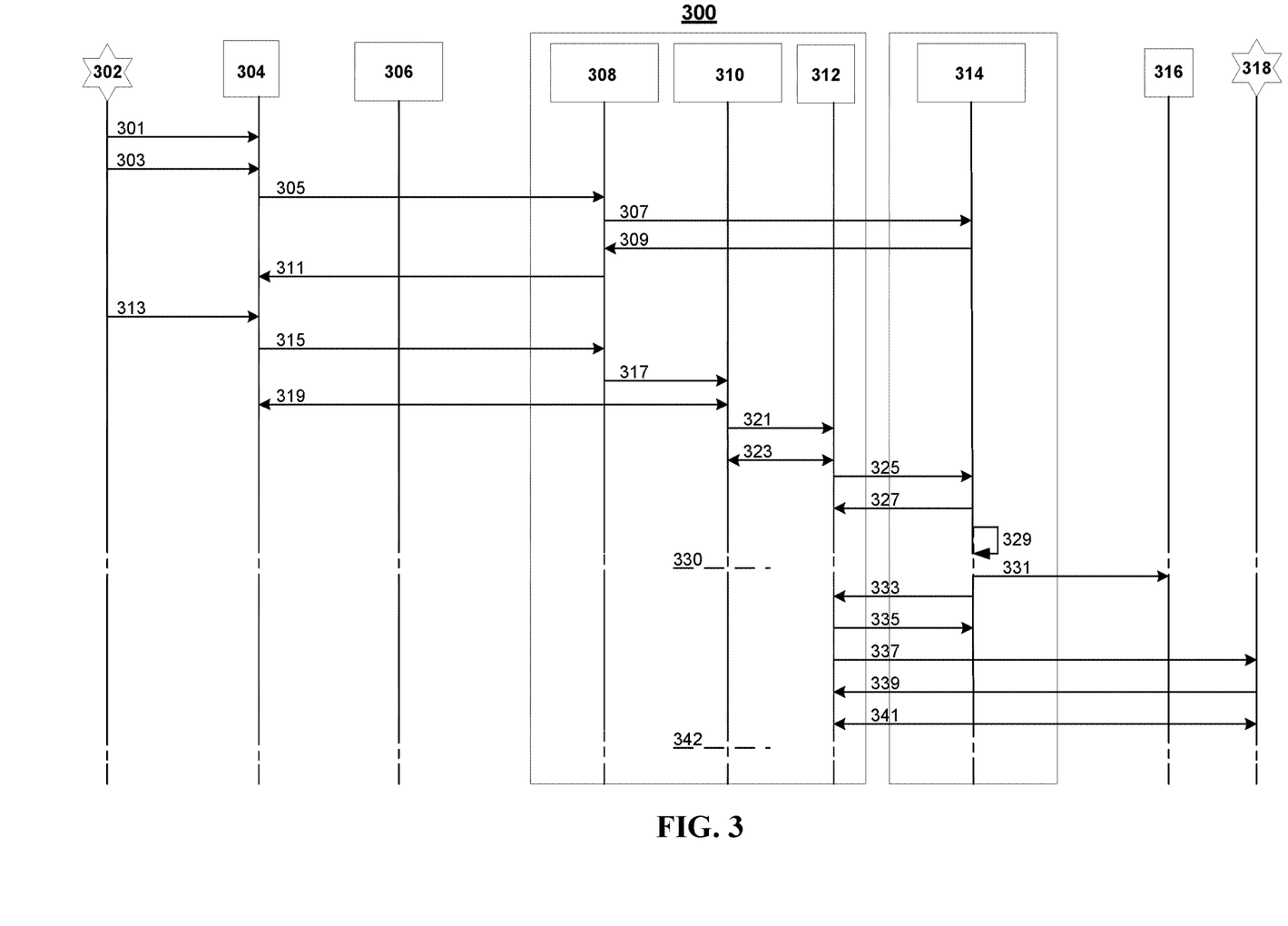
FIG. 3 is flow chart depicting the use of WebRTC for communications to/from a financial services kiosk.

FIG. 3 depicts a flow chart of a method 300 of using WebRTC for communications to/from a financial services kiosk 304 (e.g., an ATM as depicted in FIG. 3) according to various embodiments. This flow chart depicts the message flow to setup a communication channel to the remote party 318 (e.g., specialist in a contact center) from the financial services kiosk 304 using WebRTC, including multiple options for the Codec (according to various embodiments, preferred OPUS for low bandwidth). The application on the financial services kiosk 304 side may be light-weight (e.g., using just a browser application).

In order to use the communications options of the financial services kiosk 304, a customer 302 may be required to log into the financial services kiosk 304 (e.g., an ATM). By logging in, the customer's 302 identity can be verified and that information (e.g., the identity of the customer 302 as well as their associated account information) can be available to the teller or specialist 318 with which the customer 302 is communicating. For example, as depicted in FIG. 3, the customer 302 may be required to present a debit or ATM card and PIN to authenticate 301 at the financial services kiosk 304. Other forms of authentication may be used. For example, a cardless login may be used. In certain embodiments, biometric authentication may be used at the financial services kiosk 304. In certain embodiments, multi-factor authentication may be used. The teller or specialist 318 may be remotely located from the financial services kiosk 304. For example, the teller or specialist may be located in a branch of a financial institution in or near which the financial services kiosk is located. In various embodiments, the teller or specialist may be geographically separated from the financial services kiosk (e.g., located in another city, state, and/or country).

Once authenticated, the customer 302 may select at least one communications option at the ATM 304 to contact the specialist 318 by navigating (303) on the financial services kiosk 304 (e.g., voice, video, and/or chat). The financial services kiosk 304 then may transmit a call 305 to the application gateway 308 in order to obtain an estimated wait time for selected communication types. The application gateway 308, WebRTC gateway 310, and session border controller (SBC) 312 may be a part of one or more tier of networks, which may be behind a firewall 306. Upon receipt of the request from the financial services kiosk 304, the application gateway 308 may transmit a call 307 to contact center suite 314 in order to check the wait time for the selected communication type. Upon receipt of the request from the application gateway 308, the contact center suite 314 may transmit 309 an estimated wait time for the selected communication type to the application gateway 308. The customer 302 may be provided with estimated wait time 311, for example by interaction with a display on the financial services kiosk 304, to contact a specialist 318 for the selected communications type. In various embodiments, the wait time for all available communication types may be provided to the customer (i.e., beyond the selected communication type). This may allow the customer to compare wait times and select a communication type with a shorter wait time. In other embodiments, the wait times may be provided for each available communication type prior to the customer making a selection.

In certain embodiments, certain communications types may be not be available. Indication of unavailability may be presented to the customer that certain communication types may not be selectable. In various embodiments, all three types of communications may be used simultaneously or two types of communications may be used. The customer may be able to select multiple communication types. After navigating (303) the financial services kiosk 304 for potential selection of the one or more communication types (in which 303 serves as the initiation of the request), the customer 302 affirmatively requests and thereby selects a communications type(s), where 313 represents the acknowledgment of the request. A call 315 is placed to the application gateway 308 and communications paths are negotiated over the network as depicted in FIG. 3 to establish the communications path. For example, the call 315 may be made by WebRTC, Hyper Text Transfer Protocol Secure (HTTPS), JavaScript Object Notation (JSON), OPUS, G.711, G.729, H.262, or VP8. Web service provides the request 317 from the application gateway 308 to the WebRTC gateway 310 so that the OPUS codec is negotiated 319. The SBC 312 receives a SIP INVITE message 321 from the WebRTC gateway 310, and communicates thereto, for example by OPUS, G.711, G.729, H.264, or VP8. The contact center suite 314, which may be any contact center solution, receives a SIP INVITE message 325 from the SBC 312, and sends 327 a "Ringing" message to alert the SBC 312, whereby the contact center suite 314 determines the best destination 329 for execution of the routing strategy (330). For example, the best determination is determined based on a combination of one or more business rules, one or more routing rules, and state(s) of agent(s) currently logged in the system. This may be extended to a predictive algorithm applying machine learning to the above set of one or more business rules, one or more routing rules, or a combination thereof. Context data is sent 331 to a desktop application 316 that the specialist 318 may communicate with, where SIP refers or redirects by message to the location or destination 333 to the SBC 312 from the contact center suite 314 that may be able to satisfy the call, as previously determined 329. The context data provides the agent sufficient information to know what the customer was doing in the kiosk, including actions or commands performed by the customer, in addition to the profile of the customer to better facilitate the call/interaction between the specialist and the customer. A SIP "BYE" message is thereby sent 335 by SBC 312 to contact center suite 314, and a SIP Call Setup is sent 337 to the specialist 318 for receipt. A SIP "OK" response is provided 339 from the specialist 318 to the SBC 312 to indicate that the request has succeeded, and a communication session is thereby established 341.

Once established, the customer 302 may communicate and interact (342) with the specialist 318. Once the communications are completed, the communications paths may be closed. It should be appreciated that the communications according to various embodiments may be secured via SRTP or HTTPS.

In various embodiments, the WebRTC allows a user to start a first communication session (e.g., a first conversation over a first communication path) with a teller, and then allow the user to change to a second communication session (e.g., second conversation over a second communication path that is different from the first) with the teller without dropping and re-establishing the first conversation. As explained above, and by way of a non-limiting example, the first conversation could be a chat conversation, and the second conversation could be a voice and/or video conversation. The chat conversation, because it is displayed as text, may complement the video conversation since the teller can provide specific instructions (for example) that the user can see and reference during the session (i.e., to complete a desired transaction at the financial services kiosk). By providing multiple paths for the available communication types, the various embodiments allow the user to communicate and interact with the teller in multiple ways using multi-channel interaction. As a consequence, seamless transition during the change is accomplished, and the combining of voice, video and/or chat along with the addition of customer specific data, including user identity data and corresponding user account information data, various embodiments realize improved efficiencies and improved technology for providing customer service to customers at financial services kiosks.

As described above, the teller 318 may be located in a contact center 314 that is remotely located with respect to the financial services kiosk 304. The teller may communicate using a desktop application 316. Additionally, the teller 318 may be able to control operations at the financial services kiosk 304 remotely. Doing so may enable the teller 318 to assist the customer 302 with conducting a transaction. The teller 318 may be able to share information with the customer 302 through the financial services kiosk's 304 display. For example, the teller 318 may share a web browser session with the customer 302. Thus, the customer 304 can interact with the teller 318 in multiple ways.

In the foregoing description, it should be appreciated that the use of the term "teller" is meant to be exemplary and non-limiting. The term "customer service representative," "specialist," or "bank employee" may be used interchangeably with "teller."

It will be readily understood by those persons skilled in the art that the various embodiments are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the various embodiments.

Accordingly, while the various embodiments have been described here in detail in relation to its various, and, exemplary, embodiments, it is to be understood that this disclosure is only illustrative and exemplary of the various embodiments and is made to provide an enabling disclosure of the various embodiments. Accordingly, the foregoing disclosure is not intended to be construed or to limit the various embodiments or otherwise to exclude any other such embodiments, adaptations, variations, modifications or equivalent arrangements.

What is claimed is:

1. A system for providing integrated multimedia based user support, the system comprising:
   a financial services kiosk comprising:
      an input device configured to receive and transmit one or more inputs in conjunction with one or more available communication options comprising a voice communication option, a video communication option, and a text communication option;
      a microphone and a speaker configured to transmit voice communications, wherein each voice communication is transmitted across an integrated web real time communication (WebRTC) based communication link via one or more distinct communication sessions dedicated to voice communications;
      a video camera configured to transmit video communications, wherein each video communication is transmitted across the WebRTC based communication link via one or more distinct communication sessions dedicated to video communications; and
      a display configured to transmit text communications, wherein each text communication is transmitted across the WebRTC based communication link via one or more distinct communication sessions dedicated to text communications;
   an endpoint device of a support agent at a remote support center; and
   the WebRTC based communication link comprising:
      a first connection portion established between the financial services kiosk and a WebRTC gateway by a processor of the financial services kiosk via an internet connection, wherein:
         coder-decoder information is communicated between the WebRTC gateway and the financial services kiosk for transmitting multimedia communications between the WebRTC gateway and the financial services kiosk,
         the first connection portion is activated in response to a hypertext transfer protocol secure (HTTPS) connection request transmitted from the financial services kiosk to the WebRTC gateway,
         the HTTPS connection request is generated in response to one or more inputs made by an authenticated user operating the financial services kiosk,
         the one or more inputs comprise a request for multimedia communication with the endpoint device of the support agent at the remote support center via the one or more available communication options,
         the WebRTC gateway converts a HTTPS to a session initiation protocol (SIP) and establishes a SIP connection with a session border controller (SBC),
         the WebRTC gateway is communicatively coupled via a first SIP session to the SBC, and the first SIP session is initiated in response to the activation of the first connection portion; and
      a second connection portion established by the SBC initially between the SBC and a SIP server at the remote support center and afterwards between the SBC and the endpoint device at the remote support center, wherein:
         a connection between the SBC and the SIP server at the remote support center is established as a second SIP session across a SBC-dedicated web network,
         the SBC terminates the connection to the SIP server and redirects the second SIP session establishing a redirected second SIP session between the SBC and the endpoint device at the remote support center and enabling a two-way transmission of multimedia communication between the financial services kiosk and the endpoint device of the support agent at the remote support center via the one or more available communication options, and
         the authenticated user sends a communication from the financial services kiosk to the endpoint device of the support agent at the remote support center and receives a response communication from the endpoint device of the support agent at the remote support center via the one or more available communication options.

2. The system of claim 1, wherein at least two of the one or more available communication options are employed simultaneously.

3. The system of claim 1, wherein the display of the financial services kiosk is further configured to display a screen from the endpoint device of the support agent at the remote support center.

4. The system of claim 1, wherein the authenticated user operating the financial services kiosk is allowed to start a first conversation with the support agent at the remote support center operating the endpoint device across the WebRTC based communication link and then change to a second conversation during the first conversation with the support agent at the remote support center without dropping and re-establishing the first conversation.

5. The system of claim 4, wherein the first conversation is a chat conversation, and wherein the second conversation is a voice and/or a video conversation.

6. The system of claim 1, wherein the system further comprises a structure to shield privacy of a user while operating the financial services kiosk.

7. The system of claim 1, wherein the SIP server at the remote support center routes a support request from the authenticated user operating the financial services kiosk to an endpoint device associated with an appropriate support agent based on one or more rules.

8. The system of claim 7, wherein the one or more rules comprise at least one of one or more business rules and one or more routing rules.

9. The system of claim 1, further comprising making available one or more user authentication information and user account information of a user operating the financial services kiosk to the endpoint device of the support agent at the remote support center.

10. The system of claim 9, further comprising returning an estimated wait times to contact the support agent operating the endpoint device at the remote support center for the one or more available communication options.

11. A method for providing integrated multimedia based user support, the method comprising:

receiving, by an input device of a financial services kiosk, inputs in conjunction with one or more available communication options comprising a voice communication option, a video communication option, and a text communication option, wherein:
- each voice communication is transmitted across an integrated web real time communication (WebRTC) based communication link via one or more distinct communication sessions dedicated to voice communications by a microphone and a speaker of the financial services kiosk,
- each video communication is transmitted across the WebRTC based communication link via one or more distinct communication sessions dedicated to video communications by a video camera of the financial services kiosk, and
- each text communication is transmitted across the WebRTC based communication link via one or more distinct communication sessions dedicated to text communications by a display of the financial services kiosk;

establishing, by a processor of the financial services kiosk via an internet connection, a first connection portion of the WebRTC based communication link between the financial services kiosk and a WebRTC gateway, wherein:
- coder-decoder information is communicated between the WebRTC gateway and the financial services kiosk for transmitting multimedia communications between the WebRTC gateway and the financial services kiosk,
- the first connection portion is activated in response to a hypertext transfer protocol secure (HTTPS) connection request transmitted from the financial services kiosk to the WebRTC gateway,
- the HTTPS connection request is generated in response to one or more inputs made by an authenticated user operating the financial services kiosk,
- the one or more inputs comprise a request for multimedia communication with the endpoint device of the support agent at the remote support center via the one or more available communication options,
- the WebRTC gateway converts a HTTPS to a session initiation protocol (SIP) and establishes a SIP connection with a session border controller (SBC),
- the WebRTC gateway is communicatively coupled via a first SIP session to the SBC, and
- the first SIP session is initiated in response to the activation of the first connection portion;

establishing, by the SBC, a second connection portion of the WebRTC based communication link initially between the SBC and a SIP server at the remote support center and afterwards between the SBC and the endpoint device at the remote support center, wherein:
- a connection between the SBC and the SIP server at the remote support center is established as a second SIP session across a SBC-dedicated web network, and
- the SBC terminates the connection to the SIP server and redirects the second SIP session establishing a redirected second SIP session between the SBC and the endpoint device at the remote support center and enabling a two-way transmission of multimedia communication between the financial services kiosk and the endpoint device of the support agent at the remote support center via the one or more available communication options;

sending, by the financial services kiosk via the one or more available communication options, a communication from the authenticated user to the endpoint device of the support agent at the remote support center; and receiving, by the financial services kiosk via the one or more available communication options, a response communication by the authenticated user from the endpoint device of the support agent at the remote support center.

12. The method of claim 11, wherein at least two of the one or more available communication options are employed simultaneously.

13. The method of claim 11, wherein the display of the financial services kiosk further displays a screen from the endpoint device of the support agent at the remote support center.

14. The method of claim 11, wherein the authenticated user operating the financial services kiosk is allowed to start a first conversation with the support agent at the remote support center operating the endpoint device across the WebRTC based communication link and then change to a second conversation during the first conversation with the support agent at the remote support center without dropping and re-establishing the first conversation.

15. The method of claim 14, wherein the first conversation is a chat conversation, and wherein the second conversation is a voice and/or a video conversation.

16. The method of claim 11, wherein the system further comprises comprising: a structure to shield privacy of a user while operating the financial services kiosk.

17. The method of claim 11, wherein the SIP server at the remote support center routes a support request from the authenticated user operating the financial services kiosk to an endpoint device associated with an appropriate support agent based on one or more rules.

18. The method of claim 17, wherein the one or more rules comprise at least one of one or more business rules and one or more routing rules.

19. The method of claim 11, further comprising making available one or more user authentication information and user account information of a user operating the financial services kiosk to the endpoint device of the support agent at the remote support center.

20. The method of claim 19, further comprising returning an estimated wait times to contact the support agent operating the endpoint device at the remote support center for the one or more available communication options.

* * * * *